W. MALLERD.
Gas Burner.
No. 11,168.
Patented June 27, 1854.
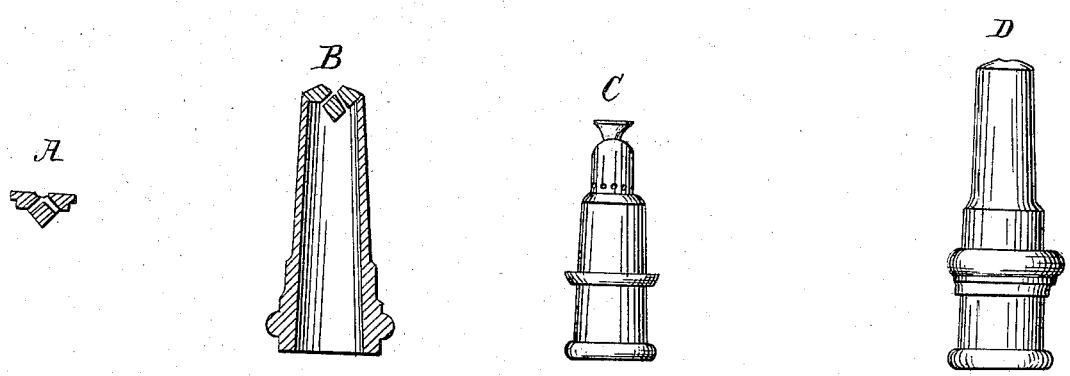

UNITED STATES PATENT OFFICE.

WILLIAM MALLERD, OF BROOKLYN, NEW YORK.

GAS-BURNER.

Specification of Letters Patent No. 11,168, dated June 27, 1854.

*To all whom it may concern:*

Be it known that I, WILLIAM MALLERD, of the city of Brooklyn, in the county of Kings and State of New York, have invented a new, and useful Improvement in Gas-Burners; and I do hereby declare that the following is a full, clear, and exact description of the same, reference being had to the annexed drawings, making part of this specification, in which—

Figure A is a longitudinal section of a fishtail tip; B is a representation of the tube in the top of which the tip is placed; C is a representation of the inner and lower portion of the gas-burner; and D is a full view of the complete gas-burner. The tip A being fused together with the tube B, at the top, and the tube B with the inner cone C at the bottom.

The nature of my invention consists in making the gas-burners called fishtails, cockspurs, Argands, or bats' wings, of a material, not heretofore used for the purpose, which material is designed to resist all corrosive influences, to which gas burners are exposed, and which injure and destroy all gas-burners now ordinarily in use, made of iron, brass or other material. I prefer to make a fishtail burner, as it is considered the most economical gas burner now in use. Sawing or drilling of gas-burners at the jets is also objectionable for several reasons: 1st. The drilling of the fishtail, cockspur, and Argand burners leaves the orifice uneven, and causes the light to tremble; and more so, if sawed on the bat's wing's burners. 2nd. The drilling and sawing leaves the surface of the orifice or slot rough, which causes the burners to corrode soon, and increases the tremulous motion, and when coated with rust, gives a poor light and much smoke.

For the purpose of rendering my gas-burners anti-corrosive, I make that part of them exposed to the flame of block-tin substantially unalloyed. I have discovered that this will perfectly answer the purpose. I have also discovered that any metal thickly coated with tin will answer the purpose. For the tube B any metal thickly coated with tin will also answer, and prevent corrosion at the point where it is connected with the tip A, and where it is likely most to be affected by the flame.

I make the tips or jets in separate pieces, and afterward connect them with the hollow tube B, by the aid of a blow pipe, without any solder. I avoid the use of the solder because the heat from the ignited gas, at the point where the tip A and tube B connects would melt it. The metal that I use in the tip A, and that used in the tube B (coated as it is with tin), would fuse together and then be unaffected by the heat of the flame, and will not corrode. If solder should be used corrosion would be inevitable.

It is an established rule to manufacture gas-burners to stand or burn at certain pressures, adapted to different localities. Seven tenths pressure is considered about the lowest. Burners are also made to stand a pressure of two inches or more. By drilling or sawing the orifice of the jet smaller, they will not give a sufficient light at a pressure of less than one half inch, lower, and will blow at about one half an inch, or less above any set pressure. I make my burners to operate at a less pressure, than ordinary gas-burners, to get a more perfect combustion. In the ordinary burners the gas often flies off with such velocity, that it simply produces a bluish flame, not giving so strong and brilliant a light, as when it is passed through my new gas-burners, which is very readily perceived when tested by a photometer or otherwise.

Having described the nature of my invention, and shown the manner in which I carry the same into effect, what I claim is—

1. Making the tip A, where the jet or jets of gas are burned, of pure tin, or other metals of which tin forms a large proportion, thickly coated with tin for the purposes set forth.

2. Making the tube B, and inner portion of burners, of tin or any metal thickly coated with tin, to prevent corrosion, and to avoid the use of solder.

3. Punching the holes through the tips or jets of the gas-burners, instead of drilling or sawing, which can be done by a hand punch, but with more accuracy and dispatch, by a small machine, for which machine I have applied for Letters Patent in England, in October, 1853, to be taken out in Michl. Hollin's name by Newton & Son. The punching of the holes creating a smoother channel obviates all the difficulties caused by sawing or drilling.

WILLIAM MALLERD.

Witnesses:
  MICH. W. CLUSKEY,
  SAML. GRUBB.